United States Patent [19]
Henry

[11] 3,897,659
[45] Aug. 5, 1975

[54] ULTRASONIC-ACOUSTIC GRINDING WHEEL SETTING STATION FOR AUTOMATIC NUMERICALLY-CONTROLLED MACHINES

[75] Inventor: John J. Henry, Oak Ridge, Tenn.

[73] Assignee: The United States of America as represented by the United States Energy Research and Development Administration, Washington, D.C.

[22] Filed: Aug. 30, 1974

[21] Appl. No.: 501,899

[52] U.S. Cl. ........ 51/165.71; 51/165.75; 51/165.92
[51] Int. Cl.² .......................................... B24B 49/10
[58] Field of Search ........ 51/165 B, 165.71, 165.74, 51/165.75, 165.92

[56] References Cited
UNITED STATES PATENTS
2,697,347  8/1953  Blanchette ...................... 51/165.75
FOREIGN PATENTS OR APPLICATIONS
850,023  9/1960  United Kingdom .............. 51/165.74

Primary Examiner—Harold D. Whitehead
Attorney, Agent, or Firm—Dean E. Carlson; David S. Zachry; David E. Breeden

[57] ABSTRACT

An ultrasonic-acoustic grinding wheel setting station for a numerically controlled machine has been provided. A precisely machined metal ball is supported at a reference position on a numerically controlled grinding machine. The ball is displaceably carried by a metal holder having a conical shaped seat machined to support the ball. The holder is mounted at the reference position on the machine by means of a phenolic support to attenuate extraneous ultrasonic vibrations induced in the machine base. A piezoelectric crystal is acoustically coupled to the ball holder to sense ultrasonic vibrations induced in the ball and transmitted through the holder when the grinding wheel touches the reference ball. The ultrasonic frequency electrical signal output of the crystal is sensed by an ultrasonic detection circuit which produces a DC output signal having an amplitude proportional to the ultrasonic signal amplitude. The DC signal may be used to signal the numerical controller to stop the grinding wheel positioning mechanism when a predetermined level DC signal is sensed to indicate that the grinding wheel is positioned at the reference point along the axis.

4 Claims, 4 Drawing Figures

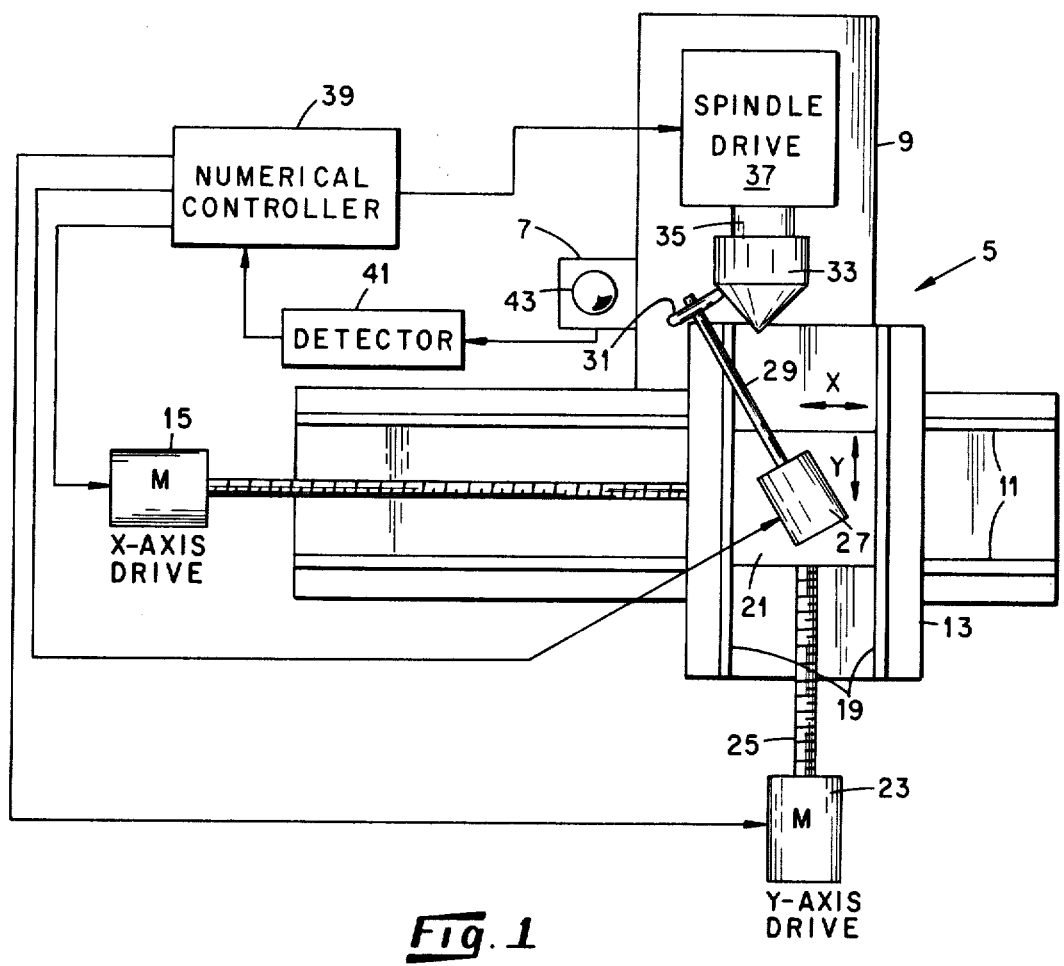
*Fig. 1*
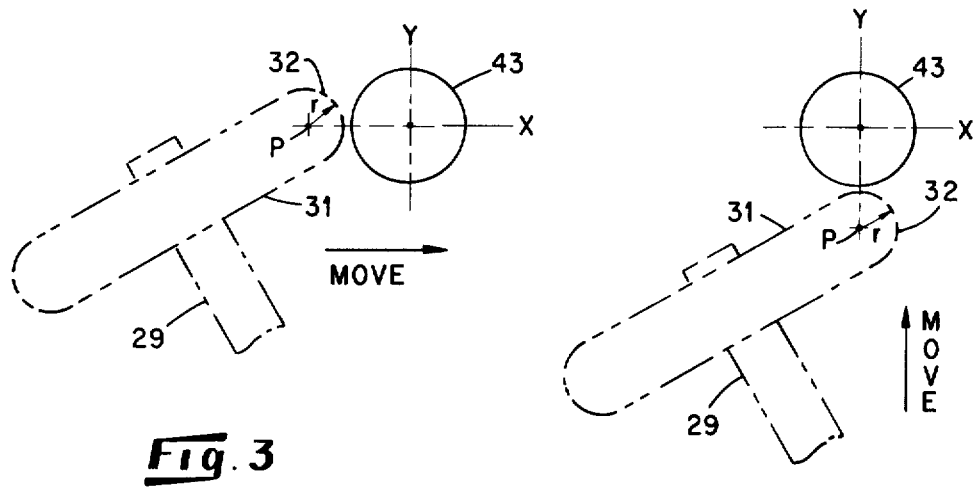
*Fig. 3*
*Fig. 4*

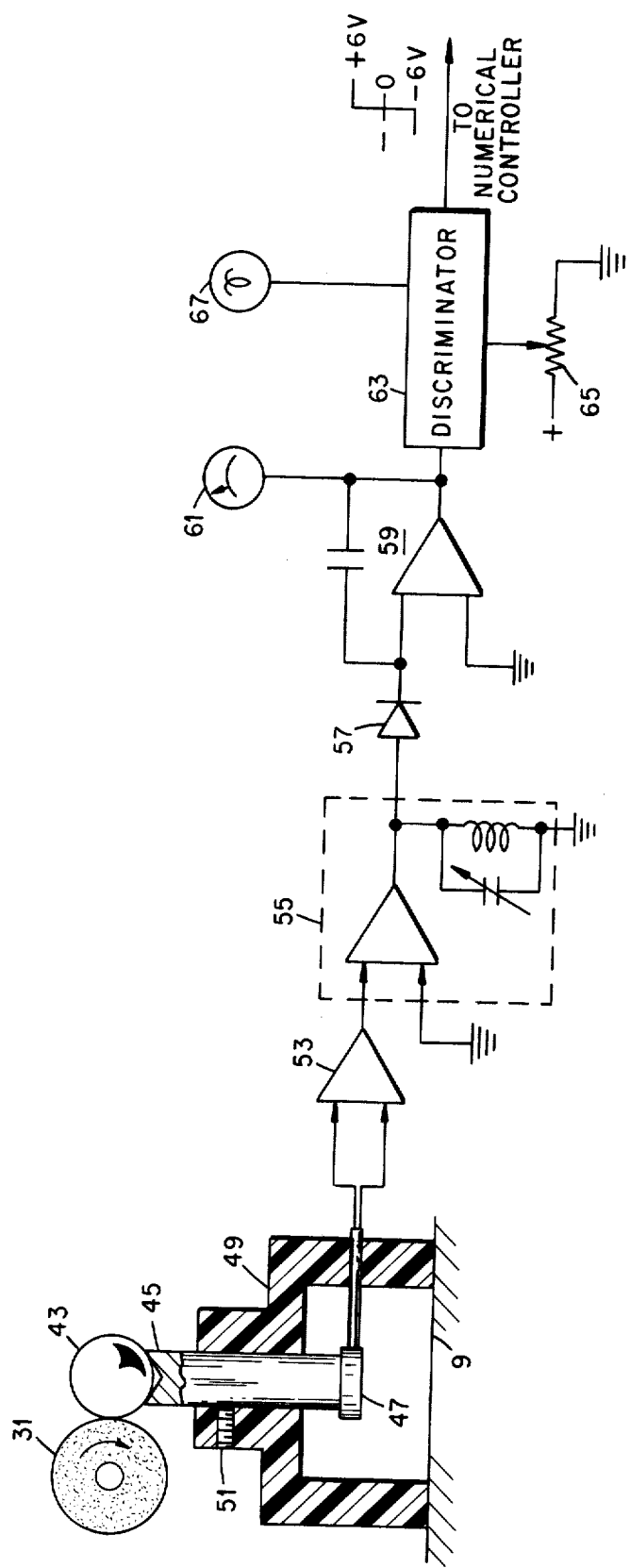

ULTRASONIC-ACOUSTIC GRINDING WHEEL SETTING STATION FOR AUTOMATIC NUMERICALLY-CONTROLLED MACHINES

BACKGROUND OF THE INVENTION

This invention was made during the course of, or under, a contract with the U.S. Atomic Energy Commission.

This invention relates generally to rotary machine tool positioning systems and more particularly to improvements in a rotary tool positioning device for use with numerically controlled (NC) grinding machines.

In order to fabricate high precision parts where hard materials are used or a fine surface finish is desired, the technique of contour grinding is often preferred over single-point turning. In high-finish grinding, only one or two high spots on the grinding wheel may contact the workpiece during rotation. Rubbing of these high spots against the work surface removes very small amounts of material in a manner similar to extremely fine single-point machining.

For accurate location of the grinding surface position, these high spots must be sensed dynamically, that is, as the wheel rotates. Such a requirement precludes the use of such static inspection tools as dial indicators and distance gauges. In addition, the poor electrical conduction of grinding wheels eliminates eddy-current, capacitance, and spark-gap non-contact gauging methods as used with single-point machining tool reference positioning systems.

Another important factor in accurately locating the grinding surface is properly compensating for the various dimensional errors that can occur. Changes in grinding surface position may be due to wheel wear, spindle length change with temperature, wheel size changes due to wheel turning, or machine instability. On a good, stable grinder, operated in a temperature-controlled environment, these errors can be minimized by accurately determining the true wheel position.

In general industrial practice, grinding wheel setting is done manually by a skilled machine operator. He detects the point where a cautiously-positioned grinding wheel just contacts the precisely located wheel-setting station, or workpiece, on the machine. Contact is sensed by the operator hearing the high-pitched sound that accompanies material removal. Because this acoustic technique is largely dependent upon operator skill and experience, the accuracy obtained is highly variable. Also, since the typical grinder wheel wears some during grinding, it may require resetting frequently during operations on a single part.

In prior attempts to achieve improved grinding wheel positioning accuracy over manual setting techniques, three different techniques were proposed. These involved electrically sensing an open circuit when a small wire positioned at a reference point was ground in two, using a commercial noncontact air gauge, and using a sonic detector comprising a tool ball setting station with a phonograph cartridge detector.

The sonic detector was the most promising of the three techniques but was sensitive to external shock and vibration received through the machine base. The result was many false acoustic signals appearing on the readout. A skilled operator could recognize these false signals but an automatic machine such as a numerically-controlled grinder could not discriminate position signals from noise. Thus, sonic acoustic setting stations, which have been useful for manual setting, are not practical for automatic grinding wheel setting on an NC machine.

SUMMARY OF THE INVENTION

In view of the above deficiencies in the art of grinding tool setting, it is an object of this invention to provide an improved system for reference positioning a grinding wheel on an automatic grinding machine.

Another object of this invention is to provide a grinding tool reference positioning system in which an ultrasonic frequency acoustic transducer is disposed to detect ultrasonic vibrations induced in a tool setting station when a rotary grinding wheel contacts said station to indicate the reference positioning of said grinding wheel.

Other objects and many of the attendant advantages of the present invention will be obvious from the following detailed description taken in conjunction with the drawings.

BRIEF DESCRIPTION OF THE DRAWINGS

FIG. 1 is a schematic diagram of a two axis, numerically controlled grinding machine including the automatic grinding wheel referencing system according to the present invention.

FIG. 2 is a detailed schematic diagram of the grinding wheel position referencing system shown in FIG. 1.

FIGS. 3 and 4 are schematic illustrations deputing the manner in which the grinding wheel is set at the reference position.

DETAILED DESCRIPTION

Referring now to FIG. 1, the grinding wheel reference positioning system is shown in schematic form for use with a two axis numerical controlled machine 5. The reference station 7 is mounted in an accessible position on the machine base 9. The machine base 9 includes a slideway 11 along the X axis of the machine in which an X axis carriage 13 is mounted for reversible movement along the X axis by means of an X axis drive motor 15 acting through a screw drive 17. The support carriage 13 has a slideway 19 disposed along the Y axis of the machine in which a Y axis carriage 21 is mounted for reversible movement along the Y axis by means of a Y axis drive motor 23 acting through a screw drive 25. A grinding wheel drive motor 27 is mounted on the Y axis carriage 21 and has an extended shaft portion 29 at the end of which there is mounted a grinding wheel 31. The grinding wheel assembly may be mounted at an angle to the Y axis as shown, so that the grinding wheel 31 is readily accessible to the entire workpiece 33 surface. The workpiece 33 may be conventionally mounted for rotation on a spindle 35 driven by a spindle drive and support assembly 37.

The machine 5 may be automatically controlled for grinding the workpiece 33 by means of a programmed numerical controller (NC) 39. As is well known in the art of NC systems, the controller 39 may be used to control the X axis and Y axis drive motors 15 and 23, respectively, to position the grinding wheel over the part 33 contour. The controller further has an output for controlling the spindle drive which rotates the part 33 at a programmed speed. Further, the grinding wheel drive motor 27 is connected to an output of the NC 39 for controlling the rotation of grinding wheel 31. As shown in FIG. 1, the reference setting station 7 has an output connected to a detector circuit 41 which produces an output signal to controller 39 when the grinding wheel 31 is brought into contact with a precisely formed steel ball 43 held by the reference station 7, as will be explained hereinbelow.

The reference position station 7 is mounted on the machine base 9 in a known reference position relative to the workpiece 33 so that the grinding wheel may be brought into contact with the ball 43 along either the X or Y axis. The wheel is positioned at a reference position prior to movement by the programmed controller 39 into the part surface so that the programmed movement of the grinding wheel by means of the X and Y axis drive motors precisely engages the surfaces of part 33 as intended by the program stored in the numerical controller 39. As pointed out above, it is essential to accurate machining or grinding that the position of the grinding wheel be established accurately along the axis of interest. Establishing the wheel position is also essential in the course of machining operations whenever it is necessary to replace the grinding wheel or reposition the grinding wheel due to wheel wear.

Referring now to FIGS. 3 and 4, it will be shown how the wheel 31 may be positioned at the proper reference point for the two axes. For contour grinding the wheel is shaped so that its working surface has a semi-circular cross section with a radius r. To check the X axis the expected center point P of the working surface 32 is positioned to the approximate center of the ball along the Y axis but to the outside of the ball from which it is to move toward the workpiece as indicated by the move path arrow. Then the X axis drive is actuated to move the wheel toward the ball and is stopped whenever contact is sensed. From the known diameter of the ball and its position on the machine, the NC can calculate the position of the reference X axis zero dimension from its present position and adjust its distance register to the correct number. This also determines the Y axis centerline of the tool ball.

The wheel is then retracted from the ball (back outside along the X axis) and moved out on the Y axis until its surface clears the tool ball in the Y axis. The wheel is then positioned so that its center point (P) of the working surface is on accurate alignment with the just determined Y axis centerline of the tool ball.

The wheel is then actuated toward the ball in the Y axis and sensing the contact determines the position of the working surface along the Y axis.

Since the working surface is normally dressed or trued for a good semi-circular configuration, errors at other contact angles are minimum.

Once a grinder setting station has been mastered to a particular machine the resultant numbers for the X and Y axis set points can become constants inserted by the program to the NC.

Referring now to FIG. 2, wherein there is shown a detailed schematic of the reference position station 7, the description of the assembly 7 and the detector circuit 41 and its operation will be described. As shown in FIG. 2, the ball 43 rests in an inverted 120° cone machined in the top of a metal support post 45. The post 45 may be fabricated from brass, stainless steel, or some other good ultrasonic transmission material which is dimensionally stable. In order to achieve a good stable fit of the ball in the cone, the cone seat is lapped-in initially and at regular intervals during its use. When the grinding wheel 31 approaches the ball 43, acoustic signals are generated as the high spots on the wheel contact the ball surface. Since it is an object to couple the acoustic signals from the ball 43 to support post 45, a suitable coupling fluid, such as silicon grease, may be disposed between the post and ball. The bottom of the support post 45 may be threaded and a conventional differential acoustic detector 47, mounted in a threaded housing, may be screwed onto the threaded post. In this manner the acoustic signals generated when the grinding wheel 31 contacts the ball 43 are coupled from post 45 into detector 47, the ball-post-detector assembly is mechanically supported by a holder member 49 which is constructed of a material which readily attenuates ultrasonic vibrations. The support post 45 is held in an upper collar of the holder 49 by means of set screws 51, only one of which is shown. The holder 49 is attached to and supported on the machine base 9.

Preferably the material for construction of the holder 49 is a dimensionally stable plastic such as a commercially available phenolic resin. Thus the term phenolic used throughout this specification is defined as a thermosetting phenolic resin such as phenol-formaldehyde, phenol-furfural, etc., in which a fibrous filler material, such as cotton linters, asbestos, etc., has been added to increase strength and shock resistance. The holder 49 is machined so that the filler fibers are oriented vertically resulting in the center assembly being supported only in shear. This added feature utilizes the highest attenuation mode of the material. The phenolic support is compatible with the coolant fluid used with grinders and provides dimensional stability and high ultrasonic attenuation required to both isolate the detector and keep the ball 43 position stable.

The detector 47 is of conventional design such as a piezoelectric crystal which has been split in half and connected differentially in series. Such an arrangement permits its use with a differential preamplifier for an improved common mode and interference rejection. The detector may be mounted inside a brass housing and potted in place with epoxy. The brass housing is threaded onto the ball support post and electrical connection is made through the holder 49 to a preamplifier 53. The epoxy functions as an ultrasonic coupling as well as a potting agent. This results in a rugged sealed unit which is impervious to the grinder coolant fluids.

Referring now to the electronic portion shown in FIG. 2, the circuit is designed to suppress audio signal noise while providing visual readout when the grinder wheel contacts the tool ball and generating an appropriate signal to the numerical control unit 39, shown in FIG. 1. Amplifier 53 is a differential wideband preamplifier that eliminates most electromagnetic interference from shop motors, soldering guns, etc. Although the preamplifier 53 attenuates signals below about 50 K Hertz, some sonic audio signals get through as well as a broad spectrum of noise. For still further signal-to-noise ratio improvement the preamplifier output is amplified by an LC-tuned bandpass amplifier circuit 55 having a bandwidth of about 50 KHz. The amplifier 55 is tunable to about 250 K Hertz through about 600 K Hertz and, when tuned near the detector 47 resonant frequency, it is particularly effective in eliminating the sonic noise picked up by the detector 47.

For level detection, the AC ultrasonic signals at the output amplifier 55 are converted to positive DC pulses by means of a diode 57 connected between the output of amplifier 55 and the input of an integrator circuit 59. The integrator time constant is set equal to about the time of two revolutions of the grinding wheel at normal operating speed. Thus short spikes that may give false signals are thereby averaged out. The integrator 59 output may be displayed on a calibrated voltmeter 61 connected to the output of integrator 59. The purpose of the meter 61 is to provide visual display to the operator of the magnitude of the output signal from integrator 59 indicating grinder wheel contact with the ball 43. To provide a trigger signal to the numerical controller 39, a level discriminator 63 is connected to the output of integrator 59. The threshold level of discriminator 63 is adjustable by means of the voltage applied to a reference input from a potentiometer 65 so that the field calibration can enable the lightest possible contact consistent with a positive indication that contact has actually been made by the grinder 31 with the ball 43. When the integrator 59 output is greater than the threshold level of discriminator 63, a DC signal, typically about 6 volts, is applied to the control unit 39. Simultaneously, a contact indicator 67, such as a light emitting diode (LED) pilot light connected to an output of discriminator 63, is activated indicating to the operator that contact has been made. This feature is useful in setup and calibration procedures.

In field tests to determine positioning accuracy under the effects of a shop environment and the application of grinding wheel coolants, tests indicated that a repeatability of within ± 40 microinches are attainable. When the grinding wheel was wet with coolant, a reduction in the discriminator threshold level was necessary due to a reduced audio signal amplitude. The effects of external shock and vibration were appraised by dropping a one inch steel ball from waist high to the floor near the machine and by tapping on the adjacent machine with screwdrivers and wrenches while observing the LED indicator 67, no false triggering was observed.

Therefore, it will be seen that a very reliable device has been provided for accurate reference position setting of the grinding wheel in an automatic, numerical controlled grinding machine. Although the invention has been described by way of specific illustration, it is to be understood that various modifications and changes may be made without departing from the spirit and scope of the invention as set forth in the appended claims attached to and forming a part of this specification.

What is claimed is:

1. In an automatic grinding machine comprising a grinding wheel, means for positioning said grinding wheel over a programmed path relative to a workpiece from a reference position on said machine, a system for detecting contact between said grinding wheel and a contact member positioned at said reference position, comprising:

a support member for displaceably carrying said contact member, said support being made of a material which readily transmits vibrations in the ultrasonic frequency range generated when said grinding wheel contacts said contact member;

a holder member for fixedly mounting said support member at said reference position on said machine, said holder member being made of a material which attenuates the transmission extraneous of ultrasonic vibrations therethrough from said machine;

an ultrasonic acoustical transducer mechanically coupled to said support member for detecting ultrasonic acoustic vibrations transmitted through said support member from said contact member when said grinding wheel contacts said contact member and generating an AC output signal having an amplitude proportional to the amplitude of the acoustic vibrations detected by said transducer; and a detector circuit means responsive to the AC output signal of said transducer for generating a DC control signal when the amplitude of the output signal of said transducer exceeds a preselected value indicative of a known contact force of said grinding wheel against said contact member.

2. The system as set forth in claim 1 wherein said contact member is a precisely formed steel ball and wherein said support member is in the form of a solid metal cylinder having a conical shaped recessed upper portion for carrying said ball.

3. The system as set forth in claim 2 wherein said detector circuit means includes a tunable bandpass amplifier for amplifying signals corresponding to the ultrasonic resonant frequency of the AC output signal of said transducer; an integrator; a diode connected between the output of said amplifier and said integrator and a discriminator connected to the output of said integrator for producing said DC output signal when the amplitude of the signal at the output of said integrator exceeds a predetermined value.

4. The system as set forth in claim 3 wherein said holder member is constructed from phenolic.

* * * * *

UNITED STATES PATENT OFFICE
CERTIFICATE OF CORRECTION

Patent No. 3,897,659  Dated August 5, 1975

Inventor(s) John J. Henry

It is certified that error appears in the above-identified patent and that said Letters Patent are hereby corrected as shown below:

Column 6, line 15, "extraneous of" to read --of extraneous--.

Signed and Sealed this seventeenth Day of February 1976

[SEAL]

Attest:

RUTH C. MASON
Attesting Officer

C. MARSHALL DANN
Commissioner of Patents and Trademarks